(12) United States Patent
Shen et al.

(10) Patent No.: US 11,140,605 B2
(45) Date of Patent: Oct. 5, 2021

(54) CELL ACCESS METHOD AND APPARATUS, AND DEVICE

(71) Applicant: HONOR DEVICE CO., LTD., Shenzhen (CN)

(72) Inventors: Li Shen, Beijing (CN); Huiping Qi, Shenzhen (CN); Yuanfeng Chen, Shenzhen (CN); Pengfei Feng, Beijing (CN); Nengfu Tang, Beijing (CN); Zixiang Xu, Beijing (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 16/463,346

(22) PCT Filed: Nov. 24, 2016

(86) PCT No.: PCT/CN2016/107151
§ 371 (c)(1),
(2) Date: May 22, 2019

(87) PCT Pub. No.: WO2018/094665
PCT Pub. Date: May 31, 2018

(65) Prior Publication Data
US 2019/0357112 A1  Nov. 21, 2019

(51) Int. Cl.
*H04W 36/30* (2009.01)
*H04W 36/32* (2009.01)

(52) U.S. Cl.
CPC ........... *H04W 36/32* (2013.01); *H04W 36/30* (2013.01)

(58) Field of Classification Search
USPC ....................................................... 370/332
See application file for complete search history.

(56) References Cited

U.S. PATENT DOCUMENTS 6,351,642 B1 * 2/2002 Corbett ................. H04W 36/32
455/442
2011/0287768 A1  11/2011 Takamatsu et al.
(Continued)

FOREIGN PATENT DOCUMENTS

CN         1336090 A    2/2002
CN       101453770 A    6/2009
(Continued)

OTHER PUBLICATIONS

Office Action issued in Chinese Application No. 201680080822.2 dated Apr. 19, 2019, 8 pages.
(Continued)

*Primary Examiner* — Jeffrey M Rutkowski
*Assistant Examiner* — Luna Weissberger
(74) *Attorney, Agent, or Firm* — Fish & Richardson P.C.

(57) ABSTRACT

A cell access method and apparatus, and a device. The method includes: obtaining a movement speed of a terminal; determining a signal strength offset value based on the movement speed; obtaining signal strength of a serving cell and signal strength of at least one neighboring cell, where the serving cell is a cell on which the terminal currently camps, and the neighboring cell is a cell in which the terminal can receive a signal; determining whether a sum of signal strength of a first neighboring cell in the at least one neighboring cell and the offset value is greater than or equal to a preset threshold; and if the sum of the signal strength of the first neighboring cell and the offset value is greater than or equal to the preset threshold, accessing, by the terminal, the first neighboring cell.

17 Claims, 7 Drawing Sheets

(56) References Cited

U.S. PATENT DOCUMENTS

| | | | |
|---|---|---|---|
| 2013/0084856 A1* | 4/2013 | Prasad | H04W 36/0088 |
| | | | 455/434 |
| 2013/0130682 A1* | 5/2013 | Awad | H04W 48/20 |
| | | | 455/434 |
| 2014/0295851 A1 | 10/2014 | Kubota et al. | |
| 2016/0073318 A1* | 3/2016 | Aguirre | H04W 36/32 |
| | | | 455/436 |
| 2017/0230883 A1 | 8/2017 | Dang | |

FOREIGN PATENT DOCUMENTS

| | | | |
|---|---|---|---|
| CN | 102547729 | A | 7/2012 |
| CN | 102769879 | A | 11/2012 |
| CN | 105208615 | A | 12/2015 |
| EP | 3038409 | A1 | 6/2016 |
| WO | 2016061734 | A1 | 4/2016 |

OTHER PUBLICATIONS

PCT International Search Report and Written Opinion issued in International Application No. PCT/CN2016/107151 dated Jun. 29, 2017, 22 pages (with English translation).

Office Action issued in Indian Application No. 201937021291 dated Feb. 11, 2021, 6 pages.

\* cited by examiner

CELL ACCESS METHOD AND APPARATUS, AND DEVICE

CROSS REFERENCE TO RELATED APPLICATIONS

This application is a national stage of International Application No. PCT/CN2016/107151, filed on Nov. 24, 2016, which is hereby incorporated by reference in its entirety.

TECHNICAL FIELD

Embodiments of this application relate to communications technologies, and in particular, to a cell access method and apparatus, and a device.

BACKGROUND

In a communications network, as a terminal moves, the terminal needs to continuously perform cell reselection, or a network side device usually needs to perform a handover operation on a serving cell for the terminal.

When cell reselection is performed, to avoid frequent ping-pong reselection, a principle of cell reselection is controlling an action of cell reselection of the terminal by using two parameters: hysteresis signal strength (which is usually 3 decibel-millivolts dBm) and a hysteresis time (which is usually set to 5 s). When received signal strength (for example, −72 dBm) of a target cell is greater than a sum of signal strength (−80 dBm) of a serving cell and the hysteresis signal strength (3 dBm), and duration is greater than the hysteresis time (for example, 5 s), cell reselection is started; otherwise, the terminal continues to camp on the current serving cell. When cell handover is performed, the network side device obtains signal strength and signal quality of a serving cell and signal strength and signal quality of a neighboring cell based on a measurement report reported by the terminal, and triggers a handover operation by using a handover decision algorithm.

However, in the prior art, if UE is in a high-speed movement scenario, for example, on a railway or an expressway, for cell reselection, because a movement speed of the UE is excessively high, a signal of a cell may rapidly change. Usually, a signal of a serving cell rapidly decreases, but a signal of a target cell rapidly increases. The following case frequently occurs: In a determining process of cell reselection, the UE leaves a coverage area of a current serving cell when duration is still less than a hysteresis time, but determining of cell reselection is not completed. After the serving cell cannot provide a service, the terminal has not accessed a target cell with a good signal, and accesses the target cell after short network disconnection. Consequently, frequent network disconnection of the terminal is caused. In addition, when cell handover is performed, when the terminal reports a measurement report to a network side device, and the network side device performs cell handover, cell handover may not be performed in a timely manner due to rapid movement of the UE. Consequently, frequent network disconnection of the terminal is caused, and user experience is diminished.

SUMMARY

Embodiments of this application provide a cell access method and apparatus, and a device, to resolve a prior-art problem of frequent network disconnection of a terminal in a high-speed movement scenario.

According to a first aspect, an embodiment of this application provides a cell access method, including:

obtaining a movement speed of a terminal;

determining a signal strength offset value based on the movement speed;

obtaining signal strength of a serving cell and signal strength of at least one neighboring cell, where the serving cell is a cell on which the terminal currently camps, and the neighboring cell is a cell in which the terminal can receive a signal;

determining whether a sum of signal strength of a first neighboring cell in the at least one neighboring cell and the offset value is greater than or equal to a preset threshold; and if the sum of the signal strength of the first neighboring cell and the offset value is greater than or equal to the preset threshold, accessing, by the terminal, the first neighboring cell.

In the cell access method provided in the first aspect, the terminal determines the offset value based on the movement speed, and accesses the first neighboring cell when the sum of the signal strength of the first neighboring cell and the offset value is greater than or equal to the preset threshold. In this way, the terminal may perform serving cell reselection or handover in advance, so that the terminal can reselect the first neighboring cell as the serving cell or can be handed over to the first neighboring cell in a timely manner. Therefore, a problem of frequent network disconnection of the terminal in a high-speed movement process is avoided, and a call completion rate of the terminal may be improved.

In a possible design, after the obtaining signal strength of at least one neighboring cell, and before the determining whether a sum of signal strength of a first neighboring cell in the at least one neighboring cell and the offset value is greater than or equal to a preset threshold, the method further includes:

determining a set of to-be-selected neighboring cells, where the set of to-be-selected neighboring cells includes a second neighboring cell whose first strength parameter is greater than that of the serving cell at a preset moment, the preset moment is a moment at which the signal strength of the serving cell and signal strength of the second neighboring cell are most recently obtained, and the first strength parameter is signal strength or a strength parameter obtained by performing calculation on signal strength;

detecting a signal change trend of the second neighboring cell in preset duration previous to the preset moment; and determining, as the first neighboring cell, the second neighboring cell whose signal change trend meets a first status, where the first status is a steady trend and/or an upward trend.

In the method provided in this possible design, the terminal uses a signal change trend of a neighboring cell as a reference condition for selecting the second neighboring cell, and determines, as the first neighboring cell, the second neighboring cell that is in the set of to-be-selected neighboring cells and whose signal change trend meets the first status in the preset duration. In this way, the signal strength of the first neighboring cell may be ensured, and probability of successful reselection or handover performed by the terminal is increased.

In a possible design, before the determining, as the first neighboring cell, the second neighboring cell whose signal change trend meets a first status, the method further includes:

detecting a signal change trend of the serving cell in the preset duration; and the determining, as the first neighboring cell, the second neighboring cell whose signal change trend meets a first status includes:

when it is determined that the signal change trend of the serving cell in the preset duration meets a second status, determining, as the first neighboring cell, the second neighboring cell whose signal change trend meets the first status, where the second status is a steady trend and/or a downward trend.

In the method provided in this possible design, the terminal uses the signal change trend of the serving cell and a signal change trend of a neighboring cell as a reference condition for selecting the second neighboring cell, and only when determining that the signal change trend of the serving cell in the preset duration meets the second status, the terminal determines, as the first neighboring cell, the second neighboring cell that is in the set of to-be-selected neighboring cells and whose signal change trend meets the first status. In this way, when the signal strength of the serving cell increases, serving cell reselection or handover is not performed. Therefore, the signal strength of the first neighboring cell is ensured, frequency of serving cell reselection or handover is reduced, and a system resource is saved.

In a possible design, the determining a signal strength offset value based on the movement speed includes:

determining the offset value based on a formula $$n = \left(\frac{a}{p}\right) * V,$$

where n is the offset value, V is the movement speed, p is a preset value, and a is a constant.

In the method provided in this possible design, the signal strength offset value is determined based on the movement speed. When the movement speed is large, the determined offset value is large. When the movement speed is small, the determined offset value is small. In this way, a time of performing cell reselection or handover in advance may be determined based on the movement speed of the terminal. Therefore, probability of successful reselection or handover is improved.

In a possible design, the obtaining a movement speed of a terminal includes:

obtaining the movement speed of the terminal by using a Global Positioning System GPS; or obtaining the movement speed of the terminal by using a sensor.

In the method provided in this possible design, the movement speed of the terminal is obtained by using the GPS or the sensor, so that the movement speed of the terminal may be obtained more easily.

In a possible design, if the terminal is in a connected state, the accessing, by the terminal, the first neighboring cell includes:

reporting a measurement event to a network side device; and receiving a response message returned by the network side device, and accessing, by the terminal, the first neighboring cell based on the response message.

In a possible design, if the terminal is in an idle state, the accessing, by the terminal, the first neighboring cell includes:

reselecting the first neighboring cell as the serving cell.

According to a second aspect, an embodiment of this application provides a cell access method, including:

determining whether signal strength of a serving cell meets a camping condition and/or a paging condition, where the serving cell is a cell on which a terminal currently camps;

if the signal strength of the serving cell meets the camping condition and/or the paging condition, starting measurement of signal strength of at least one neighboring cell, where the neighboring cell is a cell in which the terminal can receive a signal;

if the signal strength of the at least one neighboring cell is less than a first preset threshold, determining a measurement period based on a quantity of measurement times, where the measurement period increases in ascending order as the quantity of measurement times increases; and performing measurement on the at least one neighboring cell based on the measurement period.

In the cell access method provided in the second aspect, when determining that the signal strength of the at least one neighboring cell is less than the first preset threshold, the terminal may increase the measurement period based on the quantity of measurement times. In this way, frequency of measurement performed on the neighboring cell by the terminal may be reduced, and power consumption of the terminal may be reduced.

In a possible design, the method further includes:

determining whether the terminal is in a still state and/or a screen-off state;

if the terminal is in the still state and/or the screen-off state, determining whether the measurement period is greater than a second preset threshold; and if the measurement period is greater than the second preset threshold, stopping measurement of the signal strength of the at least one neighboring cell.

In the method provided in this possible design, when the signal strength of the at least one neighboring cell is less than the first preset threshold, it indicates that the terminal does not obtain, through measurement, an appropriate cell for cell reselection or handover. In this case, the terminal may determine, based on a state of the terminal, whether a user is using the terminal. If the terminal determines that the user is not using the terminal, when the measurement period is greater than the second preset threshold, the terminal stops measurement of the signal strength of the at least one neighboring cell, to reduce power consumption of the terminal.

In a possible design, the method further includes:

if the signal strength of the serving cell does not meet the camping condition and/or the paging condition, determining a network search period based on a quantity of network search times, where the network search period increases in ascending order as the quantity of network search times increases; and searching for a network based on the network search period.

In the method provided in this possible design, if the signal strength of the serving cell does not meet the camping condition and/or the paging condition, the network search period is determined based on the quantity of network search times, and the network is searched for based on the network search period. The network search period increases in ascending order as the quantity of network search times increases. The network search period gradually increases as the quantity of network search times of the terminal increases, so that the terminal can rapidly find the network, network search frequency can be reduced, and power consumption of the terminal may be reduced.

In a possible design, the method further includes:

determining a network disconnection time in which the signal strength of the serving cell does not meet the camping condition and/or the paging condition;

if the network disconnection time is greater than a third preset threshold, determining whether the terminal is in a still state and/or a screen-off state; and if the terminal is in the still state and/or the screen-off state, stopping searching for the network.

In the method provided in this possible design, when the network disconnection time is greater than the third preset threshold, and the terminal is in the still state and/or the screen-off state, searching for the network is stopped, to reduce the quantity of network search times of the terminal, so that power consumption of the terminal is reduced.

In a possible design, the method further includes:

if the terminal is in a screen-on state and/or a moving state, starting searching for the network.

In the method provided in this possible design, after searching for the network is stopped, if it is detected that the terminal is in the screen-on state and/or the moving state, it indicates that the user may use the terminal. In this case, searching for the network is restarted, so that the terminal rapidly finds an appropriate network.

According to a third aspect, an embodiment of this application provides a cell access apparatus, including:

an obtaining module, configured to obtain a movement speed of a terminal;

a determining module, configured to determine a signal strength offset value based on the movement speed, where the obtaining module is further configured to obtain signal strength of a serving cell and signal strength of at least one neighboring cell, where the serving cell is a cell on which the terminal currently camps, and the neighboring cell is a cell in which the terminal can receive a signal;

a judging module, configured to determine whether a sum of signal strength of a first neighboring cell in the at least one neighboring cell and the offset value is greater than or equal to a preset threshold; and a processing module, configured to: if the judging module determines that the sum of the signal strength of the first neighboring cell and the offset value is greater than or equal to the preset threshold, access, by the terminal, the first neighboring cell.

In a possible design, the apparatus further includes a detection module;

the determining module is further configured to determine a set of to-be-selected neighboring cells, where the set of to-be-selected neighboring cells includes a second neighboring cell whose first strength parameter is greater than that of the serving cell at a preset moment, the preset moment is a moment at which the signal strength of the serving cell and signal strength of the second neighboring cell are most recently obtained, and the first strength parameter is signal strength or a strength parameter obtained by performing calculation on signal strength;

the detection module is further configured to detect a signal change trend of the second neighboring cell in preset duration previous to the preset moment; and the determining module is further configured to determine, as the first neighboring cell, the second neighboring cell whose signal change trend meets a first status, where the first status is a steady trend and/or an upward trend.

In a possible design, the detection module is further configured to detect a signal change trend of the serving cell in the preset duration; and the determining module is further configured to: when it is determined that the signal change trend of the serving cell in the preset duration meets a second status, determine, as the first neighboring cell, the second neighboring cell whose signal change trend meets the first status, where the second status is a steady trend and/or a downward trend.

In a possible design, the determining module is further configured to determine the offset value based on a formula $$n = \left(\frac{a}{p}\right) * V,$$

where n is the offset value, V is the movement speed, p is a preset value, and a is a constant.

In a possible design, the obtaining module is specifically configured to:

obtain the movement speed of the terminal by using a Global Positioning System GPS; or obtain the movement speed of the terminal by using a sensor.

In a possible design, if the terminal is in a connected state, the processing module is specifically configured to:

report, by the terminal, a measurement event to a network side device; and receive a response message returned by the network side device, and access, by the terminal, the first neighboring cell based on the response message.

In a possible design, if the terminal is in an idle state, the processing module is specifically configured to:

reselect the first neighboring cell as the serving cell.

For beneficial effects of the cell access apparatus provided in the third aspect and the possible designs of the third aspect, refer to the beneficial effects brought by the first aspect and the possible designs of the first aspect. Details are not described herein.

According to a fourth aspect, an embodiment of this application provides a cell access apparatus, including:

a judging module, configured to determine whether signal strength of a serving cell meets a camping condition and/or a paging condition, where the serving cell is a cell on which a terminal currently camps;

a starting module, configured to: when the judging module determines that the signal strength of the serving cell meets the camping condition and/or the paging condition, start measurement of signal strength of at least one neighboring cell, where the neighboring cell is a cell in which the terminal can receive a signal;

a determining module, configured to: when the signal strength of the at least one neighboring cell is less than a first preset threshold, determine a measurement period based on a quantity of measurement times, where the measurement period increases in ascending order as the quantity of measurement times increases; and a measurement module, configured to perform measurement on the at least one neighboring cell based on the measurement period.

In a possible design, the apparatus further includes a processing module;

the judging module is further configured to determine whether the terminal is in a still state and/or a screen-off state;

the judging module is further configured to: when the terminal is in the still state and/or the screen-off state, determine whether the measurement period is greater than a second preset threshold; and the processing module is further configured to: when the measurement period is greater than the second preset threshold, stop measurement of the signal strength of the at least one neighboring cell.

In a possible design, the apparatus further includes a searching module;

the determining module is further configured to: if the signal strength of the serving cell does not meet the camping condition and/or the paging condition, determine a network search period based on a quantity of network search times, where the network search period increases in ascending order as the quantity of network search times increases; and the searching module is configured to search for a network based on the network search period.

In a possible design, the apparatus further includes a processing module;

the determining module is further configured to determine a network disconnection time in which the signal strength of the serving cell does not meet the camping condition and/or the paging condition;

the judging module is configured to: when the network disconnection time is greater than a third preset threshold, determine whether the terminal is in a still state and/or a screen-off state; and the processing module is further configured to: when the terminal is in the still state and/or the screen-off state, stop searching for the network.

In a possible design, the processing module is further configured to: when the terminal is in a screen-on state and/or a moving state, start searching for the network.

For beneficial effects of the cell access apparatus provided in the fourth aspect and the possible designs of the fourth aspect, refer to the beneficial effects brought by the second aspect and the possible designs of the second aspect. Details are not described herein.

According to a fifth aspect, an embodiment of this application provides a terminal, including:

a processor and a memory, where the processor is configured to perform the following steps by invoking an operation instruction stored in the memory:

obtaining a movement speed of the terminal;

determining a signal strength offset value based on the movement speed;

obtaining signal strength of a serving cell and signal strength of at least one neighboring cell, where the serving cell is a cell on which the terminal currently camps, and the neighboring cell is a cell in which the terminal can receive a signal;

determining whether a sum of signal strength of a first neighboring cell in the at least one neighboring cell and the offset value is greater than or equal to a preset threshold; and if the sum of the signal strength of the first neighboring cell and the offset value is greater than or equal to the preset threshold, accessing, by the terminal, the first neighboring cell.

In a possible design, the processor further performs the following steps:

determining a set of to-be-selected neighboring cells, where the set of to-be-selected neighboring cells includes a second neighboring cell whose first strength parameter is greater than that of the serving cell at a preset moment, the preset moment is a moment at which the signal strength of the serving cell and signal strength of the second neighboring cell are most recently obtained, and the first strength parameter is signal strength or a strength parameter obtained by performing calculation on signal strength;

detecting a signal change trend of the second neighboring cell in preset duration previous to the preset moment; and determining, as the first neighboring cell, the second neighboring cell whose signal change trend meets a first status, where the first status is a steady trend and/or an upward trend.

In a possible design, the processor further performs the following step:

detecting a signal change trend of the serving cell in the preset duration; and the processor specifically performs the following step:

when it is determined that the signal change trend of the serving cell in the preset duration meets a second status, determining, as the first neighboring cell, the second neighboring cell whose signal change trend meets the first status, where the second status is a steady trend and/or a downward trend.

In a possible design, the processor further performs the following step:

determining the offset value based on a formula $$n = \left(\frac{a}{p}\right) * V,$$

where n is the offset value, V is the movement speed, p is a preset value, and a is a constant.

In a possible design, the processor further performs the following step:

obtaining the movement speed of the terminal by using a Global Positioning System GPS; or obtaining the movement speed of the terminal by using a sensor.

In a possible design, if the terminal is in a connected state, the terminal further includes a transmitter and a receiver;

the transmitter is configured to report a measurement event to a network side device;

the receiver is configured to receive a response message returned by the network side device; and the processor is configured to access, by the terminal, the first neighboring cell based on the response message.

In a possible design, if the terminal is in an idle state, the processor is configured to reselect the first neighboring cell as the serving cell.

For beneficial effects of the terminal provided in the fifth aspect and the possible designs of the fifth aspect, refer to the beneficial effects brought by the first aspect and the possible designs of the first aspect. Details are not described herein.

According to a sixth aspect, an embodiment of this application provides a terminal, including:

a processor and a memory, where the processor is configured to perform the following steps by invoking an operation instruction stored in the memory:

determining whether signal strength of a serving cell meets a camping condition and/or a paging condition, where the serving cell is a cell on which the terminal currently camps;

if the signal strength of the serving cell meets the camping condition and/or the paging condition, starting measurement of signal strength of at least one neighboring cell, where the neighboring cell is a cell in which the terminal can receive a signal;

if the signal strength of the at least one neighboring cell is less than a first preset threshold, determining a measurement period based on a quantity of measurement times, where the measurement period increases in ascending order as the quantity of measurement times increases; and performing measurement on the at least one neighboring cell based on the measurement period.

In a possible design, the processor further performs the following steps:

determining whether the terminal is in a still state and/or a screen-off state;

if the terminal is in the still state and/or the screen-off state, determining whether the measurement period is greater than a second preset threshold; and if the measurement period is greater than the second preset threshold, stopping measurement of the signal strength of the at least one neighboring cell.

In a possible design, the processor further performs the following steps:

if the signal strength of the serving cell does not meet the camping condition and/or the paging condition, determining a network search period based on a quantity of network search times, where the network search period increases in ascending order as the quantity of network search times increases; and searching for a network based on the network search period.

In a possible design, the processor further performs the following steps:

determining a network disconnection time in which the signal strength of the serving cell does not meet the camping condition and/or the paging condition;

if the network disconnection time is greater than a third preset threshold, determining whether the terminal is in a still state and/or a screen-off state; and if the terminal is in the still state and/or the screen-off state, stopping searching for the network.

In a possible design, the processor further performs the following step:

if the terminal is in a screen-on state and/or a moving state, starting searching for the network.

For beneficial effects of the terminal provided in the sixth aspect and the possible designs of the sixth aspect, refer to the beneficial effects brought by the second aspect and the possible designs of the second aspect. Details are not described herein.

DESCRIPTION OF EMBODIMENTS

Figure 1:
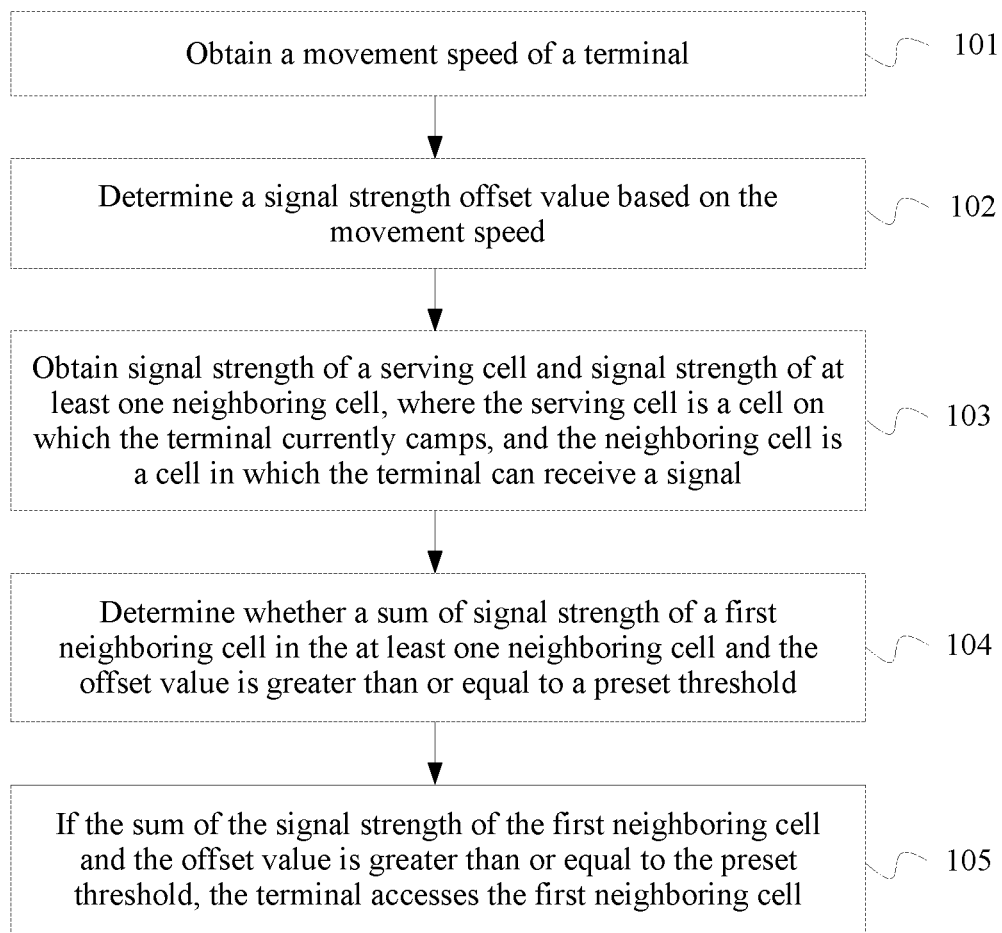
FIG. 1 is a schematic flowchart of Embodiment 1 of a cell access method according to an embodiment of this application.

The embodiments of this application are applicable to a case in which a terminal is in a movement scenario, and in particular, in a high-speed movement scenario. Because a movement speed of the terminal is excessively high, a signal of a cell may rapidly change. In a determining process of cell reselection, the terminal usually leaves a coverage area of a current serving cell when duration is still less than a hysteresis time, but determining of cell reselection is not completed. After the serving cell cannot provide a service, the terminal has not accessed a target cell with a good signal, and accesses the target cell after short network disconnection. Consequently, frequent network disconnection of the terminal is caused. When cell handover is performed, after the terminal reports a measurement report to a network side device, a signal of a target cell becomes poor before the network side device performs cell handover. Consequently, cell handover is not performed in a timely manner, and frequent network disconnection of the terminal is caused.

Therefore, the embodiments of this application provide a cell access method and a device, to resolve a prior-art technical problem of frequent network disconnection of a terminal in a high-speed movement scenario.

Before specific implementations of this application are described, some terms in this application are first explained.

A "preset moment" is a moment at which signal strength of a serving cell and signal strength of at least one neighboring cell are most recently obtained. For example, a terminal obtains the signal strength of the serving cell and the signal strength of the at least one neighboring cell based on a preset time period. It is assumed that the preset time period is 1 second, and the terminal starts to obtain the signal strength of the serving cell and the signal strength of the at least one neighboring cell at a $0^{th}$ second. As time goes by, the terminal obtains the signal strength of the serving cell and the signal strength of the at least one neighboring cell every 1 second (for example, at a $1^{st}$ second, a $2^{nd}$ second, and a $3^{rd}$ second). If a current moment is an $8^{th}$ second, and the terminal obtains the signal strength of the serving cell and the signal strength of the at least one neighboring cell, the $8^{th}$ second is the preset moment in this case. If a current moment is an $8.3^{th}$ second (any moment between the $8^{th}$ second and a $9^{th}$ second), the preset moment is still the $8^{th}$ second in this case. If a current moment is the $9^{th}$ second as time goes by, the terminal obtains the signal strength of the serving cell and the signal strength of the at least one neighboring cell again, the preset moment is the $9^{th}$ second in this case.

A "steady trend" indicates that signal strength is steady, to be specific, the signal strength varies within a preset strength range. For example, the signal strength varies within 2 decibel-millivolts (decibel-mV, dBm for short). Alternatively, the preset strength range may be another value, and may be set based on an actual application situation. This is not limited herein.

An "upward trend" indicates that signal strength continuously increases, and an increasing amplitude exceeds first preset signal strength in specific duration. The first preset signal strength may be set based on an actual application situation. This is not limited herein.

A "downward trend" indicates that signal strength continuously decreases, and a decreasing amplitude exceeds second preset signal strength in specific duration. The second preset signal strength may be set based on an actual application situation. This is not limited herein.

The following describes the technical solutions of this application in detail by using specific embodiments. The following several specific embodiments may be combined with each other, and a same or similar concept or process may not be repeatedly described in some embodiments.

FIG. 1 is a schematic flowchart of Embodiment 1 of a cell access method according to an embodiment of this application. This embodiment of this application provides a cell access method. The method may be performed by any apparatus that performs a cell access method, and the apparatus may be implemented by using software and/or hardware. In this embodiment, the apparatus may be integrated into a terminal. As shown in FIG. 1, the method in this embodiment may include the following steps.

Step 101: Obtain a movement speed of the terminal.

In this embodiment, the terminal may obtain the movement speed of the terminal in a plurality of manners, for example, may obtain the movement speed of the terminal by using a Global Positioning System (Global Positioning System, GPS for short), or may obtain the movement speed of the terminal by using a sensor. Certainly, the movement speed of the terminal may be further obtained in another manner. For example, the movement speed of the terminal is obtained by detecting an offset value of automatic frequency control of the terminal in preset duration. A specific manner of obtaining the movement speed of the terminal is not limited in this embodiment.

Step 102: Determine a signal strength offset value based on the movement speed.

In this embodiment, after obtaining the movement speed of the terminal, the terminal determines the signal strength offset value based on the obtained movement speed. A higher movement speed of the terminal indicates a larger signal strength offset value. For example, if the obtained movement speed of the terminal is 10 m/s, the determined signal strength offset value may be 1 dBm. If the obtained movement speed of the terminal is 20 m/s, the determined signal strength offset value may be 1.5 dBm.

Optionally, the determining a signal strength offset value based on the movement speed may specifically include: determining the signal strength offset value based on a formula $$n = \left(\frac{a}{p}\right) * V,$$

where n is the offset value, V is the movement speed, and p is a preset value. A specific value of p may be determined based on the movement speed. During actual application, a higher movement speed indicates a larger value of p. For example, if the movement speed is from 0 to 140 kilometers per hour, p may be set to 80. If the movement speed is from 141 to 180 kilometers per hour, p may be set to 100. In addition, a is a constant. A specific value of a may be set based on an actual situation or experience. For example, a may be 6, or may be 6.5. The specific value of a is not limited in this embodiment.

For example, if V is 180 kilometers per hour, p=100, and a=5, n=9 dBm.

Step 103: Obtain signal strength of a serving cell and signal strength of at least one neighboring cell, where the serving cell is a cell on which the terminal currently camps, and the neighboring cell is a cell in which the terminal can receive a signal.

In this embodiment, the terminal may obtain the signal strength of the serving cell and the signal strength of the at least one neighboring cell based on a preset time period. The serving cell is the cell on which the terminal currently camps, the neighboring cell is the cell in which the terminal can receive a signal, and there may be one or more neighboring cells.

It may be understood that, in a time period from a moment at which the terminal starts obtaining signal strength to a current moment, the terminal obtains the signal strength of the serving cell and the signal strength of the at least one neighboring cell by using the preset time period as an interval. For example, if the terminal starts obtaining the signal strength at a $0^{th}$ second, a current moment is a $6.3^{th}$ second, and the preset time period is 2 seconds, the terminal obtains the signal strength of the serving cell and the signal strength of the at least one neighboring cell at the $0^{th}$ second, a $2^{nd}$ second, a $4^{th}$ second, and a $6^{th}$ second.

It should be noted that the preset time period may be set based on an actual situation, for example, may be set to 1 second, 0.5 seconds, or another value. A specific value of the preset time period is not limited in this embodiment.

Step 104: Determine whether a sum of signal strength of a first neighboring cell in the at least one neighboring cell and the offset value is greater than or equal to a preset threshold.

In this embodiment, the first neighboring cell is a neighboring cell that is in the at least one neighboring cell and whose signal change trend meets a steady trend and/or an upward trend.

That the signal strength change trend of the first neighboring cell meets the steady trend indicates that the signal strength of the first neighboring cell varies within a preset strength range. For example, if the preset strength range is 20 dbm, the signal strength that is of the first neighboring cell and that is obtained by the terminal at a $0^{th}$ second is 40 dbm, the signal strength of the first neighboring cell at a $2^{nd}$ second is 35 dbm, the signal strength of the first neighboring cell at a $4^{th}$ second is 45 dbm, and the signal strength of the first neighboring cell at a $6^{th}$ second is 30 dbm, the signal strength of the first neighboring cell varies within 20 dbm, and therefore, the signal strength change trend of the first neighboring cell meets the steady trend.

That the signal strength change trend of the first neighboring cell meets the upward trend indicates that the signal strength of the first neighboring cell continuously increases and an increasing amplitude exceeds first preset signal strength in specific duration. For example, if the specific duration is 8 s, the first preset signal strength is 20 dbm, the signal strength that is of the first neighboring cell and that is obtained by the terminal at a $0^{th}$ second is 20 dbm, the signal strength of the first neighboring cell at a $2^{nd}$ second is 25 dbm, the signal strength of the first neighboring cell at a $4^{th}$ second is 32 dbm, and the signal strength of the first neighboring cell at a $6^{th}$ second is 45 dbm, the signal strength of the first neighboring cell continuously increases, the increasing amplitude exceeds 20 dbm in 8 s, and therefore, the signal strength change trend of the first neighboring cell meets the upward trend.

That the signal strength change trend of the first neighboring cell meets the steady trend and the upward trend indicates that the signal strength of the first neighboring cell varies within a preset strength range, the signal strength of the first neighboring cell continuously increases, and an increasing amplitude exceeds first preset signal strength in specific duration. For example, if the preset strength range is 25 dbm, the specific duration is 6 s, the first preset signal strength is 20 dbm, the signal strength that is of the first neighboring cell and that is obtained by the terminal at a $0^{th}$ second is 21 dbm, the signal strength of the first neighboring cell at a $2^{nd}$ second is 25 dbm, the signal strength of the first neighboring cell at a $4^{th}$ second is 38 dbm, and the signal strength of the first neighboring cell at a $6^{th}$ second is 45 dbm, the signal strength of the first neighboring cell varies within 25 dbm, the signal strength of the first neighboring cell continuously increases, the increasing amplitude exceeds 20 dbm in 6 s, and therefore, the signal strength change trend of the first neighboring cell meets the steady trend and the upward trend. That the signal strength change trend of the first neighboring cell meets the steady trend and the upward trend herein indicates that the signal strength of the first neighboring cell varies within the preset strength range, the signal strength of the first neighboring cell continuously increases, and the increasing amplitude exceeds the first preset signal strength in the specific duration. This further ensures that the first neighboring cell is a target cell whose signal strength is steady, and therefore may ensure a continuous network connection of the terminal.

The terminal adds the obtained signal strength of the first neighboring cell and the determined offset value, and determines whether an addition result is greater than or equal to the preset threshold. For example, if the preset threshold is −70 dBm, the signal strength that is of the first neighboring cell and that is obtained by the terminal is −72 dBm, and the determined offset value is 2 dBm, the terminal may determine that the sum of the signal strength of the first neighboring cell and the offset value is equal to the preset threshold. The preset threshold may be set based on an actual situation or experience, for example, may be −70 dBm or −75 dBm. A specific value of the preset threshold is not limited in this embodiment.

Step 105: If the sum of the signal strength of the first neighboring cell and the offset value is greater than or equal to the preset threshold, the terminal accesses the first neighboring cell.

In this embodiment, if the terminal determines that the sum of the signal strength of the first neighboring cell and the offset value is greater than or equal to the preset threshold, the terminal accesses the first neighboring cell.

Because the offset value is added to the obtained signal strength of the first neighboring cell, in other words, compensation is performed on the movement speed of the terminal, the terminal may perform reselection or handover before performing normal cell reselection or handover. Therefore, the terminal is prevented from leaving a current serving cell before reselection or handover is completed in a movement process, so that frequent network disconnection of the terminal is avoided.

Optionally, if the terminal is in a connected state, that the terminal accesses the first neighboring cell includes: The terminal reports a measurement event to a network side device, receives a response message returned by the network side device, and accesses the first neighboring cell based on the response message.

For example, the network side device may be a base station. When the terminal is in the connected state, and the terminal determines that the sum of the signal strength of the first neighboring cell and the offset value is greater than or equal to the preset threshold, the terminal reports the measurement event to the network side device. Because the offset value is added to the obtained signal strength of the first neighboring cell, the terminal may report the measurement event to the network side device in advance. After receiving the measurement event sent by the terminal, the network side device returns the response message to the terminal, so that the terminal accesses the first neighboring cell based on the response message. It may be understood that, when the terminal is in a moving process, because the terminal reports the measurement event to the network side device in advance, the terminal may be prevented from leaving the serving cell before a cell handover process is completed, so that frequent network disconnection of the terminal is avoided, and user experience is improved.

Optionally, if the terminal is in an idle state, that the terminal accesses the first neighboring cell includes: reselecting the first neighboring cell as the serving cell.

Specifically, if the terminal is in the idle state, when the terminal determines that the sum of the signal strength of the first neighboring cell and the offset value is greater than or equal to the preset threshold, the first neighboring cell is reselected as the serving cell. Because the offset value is added to the obtained signal strength of the first neighboring cell, the terminal may perform cell reselection in advance. It may be understood that, when the terminal is in a moving process, because the terminal performs cell reselection in advance, the terminal may be prevented from leaving the serving cell before a cell reselection process is completed, so that frequent network disconnection of the terminal is avoided, and user experience is improved.

In the cell access method provided in this embodiment of this application, the movement speed of the terminal is obtained, the signal strength offset value is determined based on the movement speed, the signal strength of the serving cell and the signal strength of the at least one neighboring cell are obtained, and when the sum of the signal strength of the first neighboring cell in the at least one neighboring cell and the offset value is greater than or equal to the preset threshold, the terminal accesses the first neighboring cell. The terminal determines the offset value based on the movement speed, and accesses the first neighboring cell when the sum of the signal strength of the first neighboring cell and the offset value is greater than or equal to the preset threshold. In this way, the terminal may perform serving cell reselection or handover in advance, so that the terminal can reselect the first neighboring cell as the serving cell or can be handed over to the first neighboring cell in a timely manner. Therefore, a problem of frequent network disconnection of the terminal in a high-speed movement process is avoided, and a call completion rate of the terminal may be improved.

Figure 2:
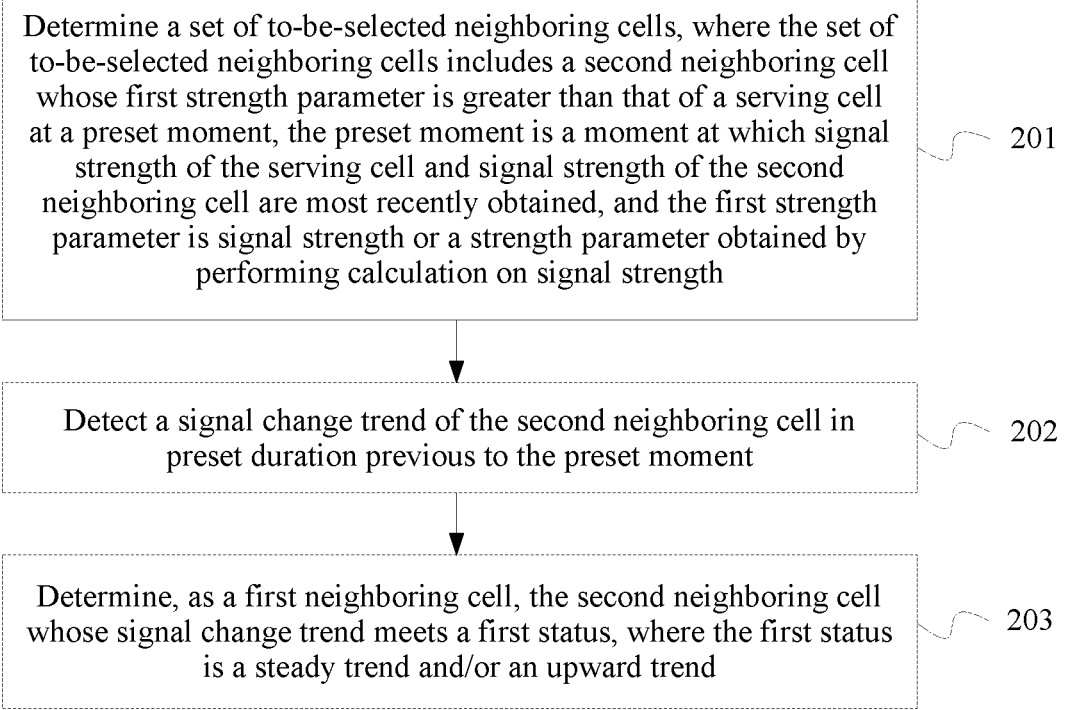
FIG. 2 is a schematic flowchart of Embodiment 2 of a cell access method according to an embodiment of this application.

FIG. 2 is a schematic flowchart of Embodiment 2 of a cell access method according to an embodiment of this application. Based on the embodiment shown in FIG. 1, a manner of determining the first neighboring cell in the at least one neighboring cell after the signal strength of the at least one neighboring cell is obtained is described in detail in this embodiment. As shown in FIG. 2, the method in this embodiment may include the following steps.

Step 201: Determine a set of to-be-selected neighboring cells, where the set of to-be-selected neighboring cells includes a second neighboring cell whose first strength parameter is greater than that of the serving cell at a preset moment, the preset moment is a moment at which the signal strength of the serving cell and signal strength of the second neighboring cell are most recently obtained, and the first strength parameter is signal strength or a strength parameter obtained by performing calculation on signal strength.

In this embodiment, after the terminal obtains the signal strength of the serving cell and the signal strength of the neighboring cell based on the preset time period, the terminal may compare the first strength parameter of the serving cell at the preset moment with a first strength parameter of each neighboring cell at the preset moment. The set of to-be-selected neighboring cells includes a neighboring cell whose first strength parameter is greater than that of the serving cell at the preset moment. The preset moment is the moment at which the signal strength of the serving cell and the signal strength of the second neighboring cell are most recently obtained. The first strength parameter is the signal strength or the strength parameter obtained by performing calculation on the signal strength.

When the first strength parameter is the strength parameter obtained by performing calculation on the signal strength. There may be many specific calculation manners. For example, in a Global System for Mobile Communications (Global System for Mobile Communication, GSM for short), the first strength parameter may be obtained by subtracting receiver sensitivity RXLEV_ACCESS_MIN of a cell base station from signal strength Rxlev. In another access mode, the strength parameter may be calculated by using a similar method. Certainly, the strength parameter may be calculated by using another method. For example, the strength parameter may be obtained by subtracting a product of receiver sensitivity of a cell base station and a specified weighted value (for example, 40%) from signal strength, or may be obtained by performing calculation on the signal strength and a parameter of another cell base station based on an actual application requirement. This is not limited herein.

It may be understood that the preset moment is different from a moment of performing step 201. The moment of performing step 201 may be the preset moment, or may not be the preset moment. This is not limited herein. For example, it is assumed that the terminal starts to obtain the signal strength of the serving cell and the signal strength of the at least one neighboring cell at a $0^{th}$ second based on the preset time period of 1 second. If the moment of performing step 201 is a $6.4^{th}$ second, a moment at which the terminal most recently obtains the signal strength of the serving cell and the signal strength of the at least one neighboring cell is a $6^{th}$ second. In this case, the moment of performing step 201 is the $6.4^{th}$ second, and the preset moment is the $6^{th}$ second. If the moment of performing step 201 is an $8^{th}$ second, a moment at which the terminal most recently obtains the signal strength of the serving cell and the signal strength of the at least one neighboring cell is the $8^{th}$ second. In this case, the moment of performing step 201 is the same as the preset moment, that is, the $8^{th}$ second.

Step 202: Detect a signal change trend of the second neighboring cell in preset duration previous to the preset moment.

In this embodiment, after obtaining the set of to-be-selected neighboring cells, the terminal detects signal change trends of all neighboring cells in the set of to-be-selected neighboring cells in the preset duration previous to the preset moment. The signal change trend includes a steady trend, an upward trend, or a downward trend.

It may be understood that, because the signal change trends of all the neighboring cells in the set of to-be-selected neighboring cells need to be detected, the preset duration needs to be greater than the preset time period and the signal change trend can be detected in the preset duration, to be specific, the signal strength of the serving cell and the signal strength of the neighboring cell can be detected for at least three times in the preset duration. Further, an end time of the preset duration may be a moment previous to the preset moment provided that the signal change trend in the preset duration can reflect a signal change trend at the preset moment to some extent. Certainly, when the end time of the preset duration is closer to the preset moment, the signal change trend at the preset moment can be better reflected. The preset duration and the end time of the preset duration may be set based on an actual application situation. Optionally, the end time of the preset duration is the preset moment. For example, it is assumed that the terminal starts to obtain the signal strength of the serving cell and the signal strength of the at least one neighboring cell at a $0^{th}$ second. If a current moment is a $6^{th}$ second, the preset time period is 1 second, and the preset duration may be 5 seconds, the terminal detects the signal change trends of all the neighboring cells in the set of to-be-selected neighboring cells in 5 seconds from a $1^{st}$ second to the $6^{th}$ second. If the current moment is an $8^{th}$ second, the terminal detects the signal change trends of all the neighboring cells in the set of to-be-selected neighboring cells in 5 seconds from a $3^{rd}$ second to the $8^{th}$ second. The preset duration may be set based on an actual application situation provided that a signal change trend of a neighboring cell in the preset duration can be determined.

Step 203: Determine, as the first neighboring cell, the second neighboring cell whose signal change trend meets a first status, where the first status is a steady trend and/or an upward trend.

In this embodiment, after detecting the signal change trends of all the neighboring cells in the set of to-be-selected neighboring cells in the preset duration, the terminal determines, as the first neighboring cell, the second neighboring cell that is in the set of to-be-selected neighboring cells and whose signal change trend meets the first status. The first status is the steady trend and/or the upward trend.

It may be understood that there are three manners:

In a first manner, the terminal determines, as the first neighboring cell, the second neighboring cell that is in the set of to-be-selected neighboring cells and whose signal change trend meets the steady trend.

In a second manner, the terminal determines, as the first neighboring cell, the second neighboring cell that is in the set of to-be-selected neighboring cells and whose signal change trend meets the upward trend.

In a third manner, the terminal determines, as the first neighboring cell, the second neighboring cell that is in the set of to-be-selected neighboring cells and whose signal change trend meets the steady trend and the upward trend.

In a specific implementation process, an appropriate manner may be selected from the three manners based on an actual application requirement. This is not limited herein. In a general case, to ensure an excellent signal in the first neighboring cell, the second manner is preferably selected; to ensure a continuous network connection of the terminal as much as possible, the third manner is preferably selected.

Optionally, based on the foregoing embodiment, the terminal determines, as the first neighboring cell, the second neighboring cell that is in the set of to-be-selected neighboring cells and whose signal change trend meets the first status. However, in this case, a signal change trend of the serving cell may be an upward trend, a steady trend, or a downward trend. In actual application, before determining, as the first neighboring cell, the second neighboring cell that is in the set of to-be-selected neighboring cells and whose signal change trend meets the first status, the terminal may first detect the signal change trend of the serving cell in the preset duration. When determining that the signal change trend of the serving cell in the preset duration meets a second status, the terminal determines, as the first neighboring cell, the second neighboring cell whose signal change trend meets the first status. The second status is a steady trend and/or a downward trend.

Specifically, after obtaining the signal strength of the serving cell, the terminal may detect the signal change trend of the serving cell in the preset duration, and determines whether the signal change trend of the serving cell in the preset duration meets the second status.

It may be understood that the second status is the steady trend and/or the downward trend, and therefore, there are three manners of determining that the signal change trend of the serving cell meets the second status.

In a first manner, when determining that the signal change trend of the serving cell in the preset duration meets the steady trend, the terminal determines that the signal change trend of the serving cell in the preset duration meets the second status.

In a second manner, when determining that the signal change trend of the serving cell in the preset duration meets the downward trend, the terminal determines that the signal change trend of the serving cell in the preset duration meets the second status.

In a third manner, when determining that the signal change trend of the serving cell in the preset duration meets the downward trend and the steady trend, the terminal determines that the signal change trend of the serving cell in the preset duration meets the second status.

An appropriate manner may be selected from the three manners based on an actual application requirement. This is not limited herein. In a general case, if frequency of cell reselection needs to be reduced, the second manner is preferably selected; if a continuous network connection of the terminal needs to be ensured as much as possible, the third manner is preferably selected.

When determining that the signal change trend of the serving cell in the preset duration meets the second status, the terminal determines, as the first neighboring cell, the second neighboring cell whose signal change trend meets the first status.

It may be understood that there are three manners of determining that the signal change trend of the serving cell meets the second status, and there are also three manners of determining that the signal change trend of the second neighboring cell meets the first status. The manners of determining that the signal change trend of the serving cell meets the second status and the manners of determining that the signal change trend of the second neighboring cell meets the first status may be randomly combined based on an actual requirement, to achieve different effects. For example, to ensure an excellent signal in a target cell and reduction in frequency of cell reselection, the second manner of determining that the signal change trend of the serving cell meets the second status and the second manner of determining that the signal change trend of the second neighboring cell meets the first status may be preferably combined. To achieve another effect, another combination of various manners may be performed based on a specific situation. This is not limited herein.

It should be noted that if the terminal determines that the signal change trend of the serving cell in the preset duration does not meet the second status, it indicates that the signal change trend that is of the serving cell in the preset duration and that is determined at the preset moment does not meet a reselection or handover requirement, and an opportunity for reselecting or handing over the serving cell does not arrive. The terminal may wait to determine the second neighboring cell again in a next period.

In the cell access method provided in this embodiment of this application, the terminal uses the signal change trend of the serving cell and the signal change trend of the neighboring cell as a reference condition for selecting the second neighboring cell, and only when determining that the signal change trend of the serving cell in the preset duration meets the second status, the terminal determines, as the first neighboring cell, the second neighboring cell that is in the set of to-be-selected neighboring cells and whose signal change trend meets the first status. In this way, when the signal strength of the serving cell increases, serving cell reselection or handover is not performed. Therefore, signal strength of the first neighboring cell is ensured, frequency of serving cell reselection or handover is reduced, and a system resource is saved.

It may be understood that, in actual application, only the signal change trend of the neighboring cell may be used as the reference condition based on an actual situation requirement. Regardless of whether the signal change trend of the serving cell meets the upward trend, subsequent determining of the second neighboring cell is performed provided that the signal change trend of the neighboring cell meets the second status. This is not limited herein.

Figure 3:
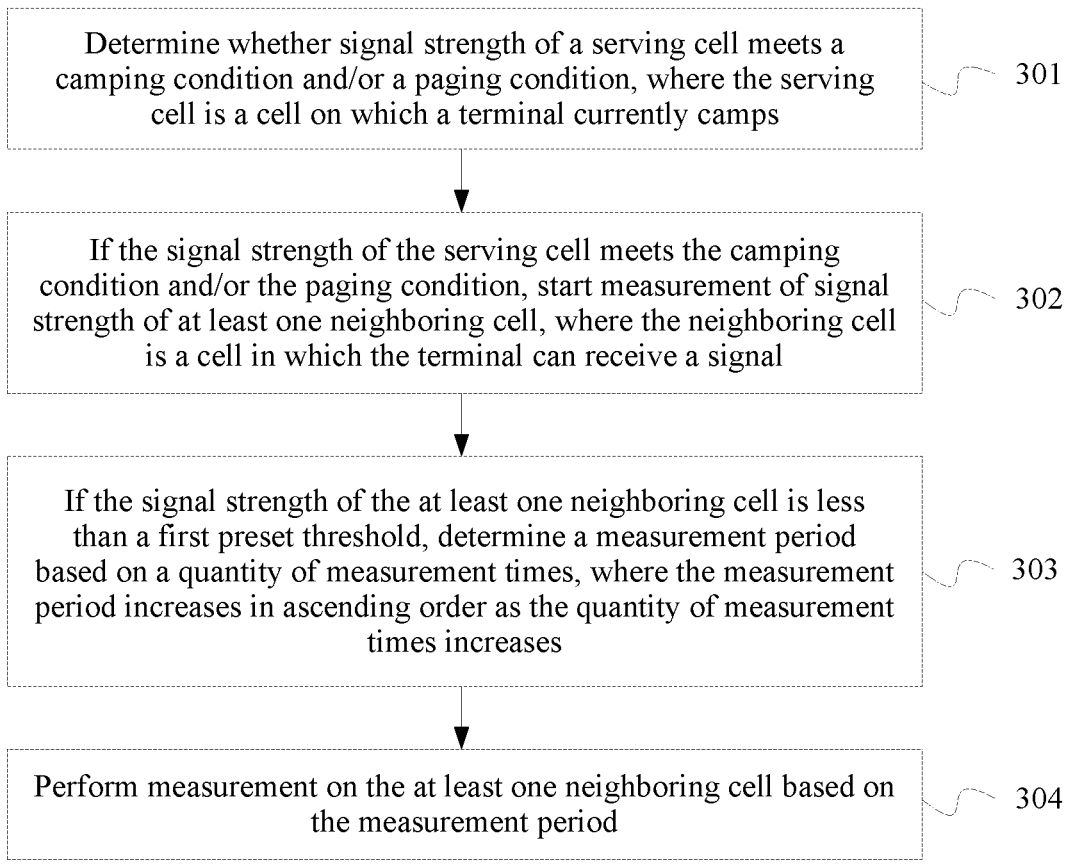
FIG. 3 is a schematic flowchart of Embodiment 3 of a cell access method according to an embodiment of this application.

FIG. 3 is a schematic flowchart of Embodiment 3 of a cell access method according to an embodiment of this application. This embodiment of this application provides a cell access method. The method may be performed by any apparatus that performs a cell access method, and the apparatus may be implemented by using software and/or hardware. In this embodiment, the apparatus may be integrated into a terminal. As shown in FIG. 3, the method in this embodiment may include the following steps.

Step 301: Determine whether signal strength of a serving cell meets a camping condition and/or a paging condition, where the serving cell is a cell on which the terminal currently camps.

In this embodiment, the terminal may obtain the signal strength of the serving cell based on a preset time period. After obtaining the signal strength of the serving cell, the terminal may determine whether the signal strength meets the camping condition and/or the paging condition of the terminal in the serving cell. In a specific implementation process, the terminal may determine, by determining whether the signal strength of the serving cell is greater than a preset threshold, whether the signal strength of the serving cell meets the camping condition and/or the paging condition. When the signal strength of the serving cell is greater than the preset threshold, the signal strength of the serving cell meets the camping condition and/or the paging condition.

Step 302: If the signal strength of the serving cell meets the camping condition and/or the paging condition, start measurement of signal strength of at least one neighboring cell, where the neighboring cell is a cell in which the terminal can receive a signal.

In this embodiment, when determining that the signal strength of the serving cell meets the camping condition and/or the paging condition, the terminal starts measurement of the signal strength of the at least one neighboring cell, and determines whether the signal strength of the at least one neighboring cell is less than a preset threshold.

Step 303: If the signal strength of the at least one neighboring cell is less than a first preset threshold, determine a measurement period based on a quantity of measurement times, where the measurement period increases in ascending order as the quantity of measurement times increases.

In this embodiment, if measured signal strength of all neighboring cells is less than the first preset threshold, it indicates that no appropriate neighboring cell is obtained through measurement. In this case, the measurement period may be determined based on the quantity of times of measurement performed on the neighboring cell. In actual application, the measurement period may increase in ascending order as the quantity of measurement times increases. For example, after the terminal performs measurement on the neighboring cell, and finds that the signal strength of the at least one neighboring cell is less than the first preset threshold, the terminal may determine the measurement period between a current measurement and a next measurement performed on the neighboring cell as 5 s. After 5 s, the terminal starts measurement on the neighboring cell, and finds that the signal strength of the at least one neighboring cell is less than the first preset threshold, the terminal may determine the measurement period between a current measurement and a next measurement performed on the neighboring cell as 8 s. After 8 s, the terminal starts measurement on the neighboring cell again. The process is repeatedly performed, and when the measurement period is greater than a preset period, measurement of the signal strength of the at least one neighboring cell is stopped.

The first preset threshold may be selected based on an actual situation or experience, for example, may be set to −20 dbm. A specific value of the first preset threshold is not limited in this embodiment.

Optionally, when the signal strength of the at least one neighboring cell is less than the first preset threshold, it indicates that the terminal does not obtain, through measurement, an appropriate cell for cell reselection or handover. In this case, the terminal may determine, based on a state of the terminal, whether a user is using the terminal. If the terminal determines that the user is not using the terminal, when the measurement period is greater than a second preset threshold, the terminal stops measurement of the signal strength of the at least one neighboring cell, to reduce power consumption of the terminal. In a specific implementation process, whether the terminal is in a still state and/or a screen-off state is determined. If the terminal is in the still state and/or the screen-off state, it indicates that the user does not use the terminal at a current moment. In this case, whether the measurement period is greater than the second preset threshold is determined, and if the measurement period is greater than the second preset threshold, measurement of the signal strength of the at least one neighboring cell is stopped.

Step 304: Perform measurement on the at least one neighboring cell based on the measurement period.

In this embodiment, after determining the measurement period, the terminal measures the signal strength of the at least one neighboring cell based on the measurement period.

In the cell access method provided in this embodiment of this application, when the signal strength of the serving cell meets the camping condition and/or the paging condition, measurement of the signal strength of the at least one neighboring cell is started; when the signal strength of the at least one neighboring cell is less than the first preset threshold, the measurement period is determined based on the quantity of measurement times, where the measurement period increases in ascending order as the quantity of measurement times increases; and the terminal performs measurement on the at least one neighboring cell based on the measurement period. When determining that the signal strength of the at least one neighboring cell is less than the first preset threshold, the terminal may increase the measurement period based on the quantity of measurement times. In this way, frequency of measurement performed on the neighboring cell by the terminal may be reduced, and power consumption of the terminal may be reduced. In addition, when it is determined that the terminal is in the still state and/or the screen-off state, the measurement period may be increased until UE does not perform cell reselection. Therefore, power consumption of the terminal may be reduced.

Figure 4:
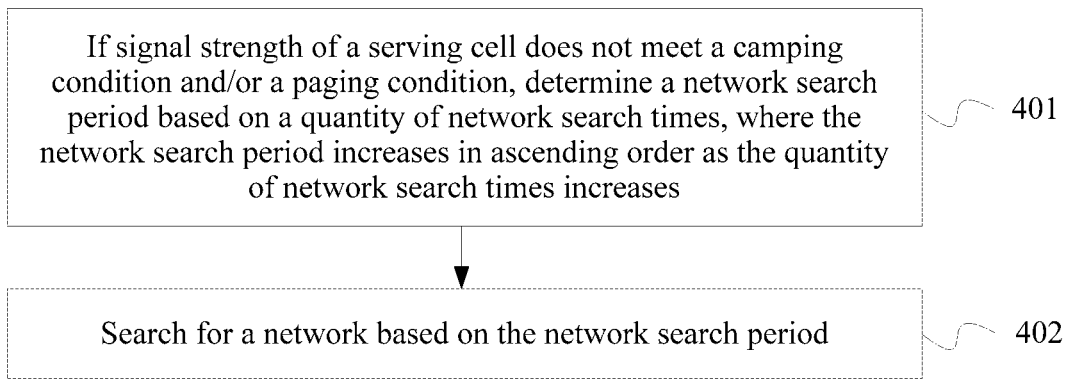
FIG. 4 is a schematic flowchart of Embodiment 4 of a cell access method according to an embodiment of this application.

FIG. 4 is a schematic flowchart of Embodiment 4 of a cell access method according to an embodiment of this application. Based on the embodiment shown in FIG. 3, a manner of determining a network search period when the signal strength of the serving cell does not meet the camping condition and/or the paging condition is described in detail in this embodiment. As shown in FIG. 4, the method in this embodiment may include the following steps.

Step 401: If the signal strength of the serving cell does not meet the camping condition and/or the paging condition, determine a network search period based on a quantity of network search times, where the network search period increases in ascending order as the quantity of network search times increases.

In this embodiment, when it is determined that the signal strength of the serving cell does not meet the camping condition and/or the paging condition, in other words, when the terminal is in a network lost state, the terminal determines the network search period based on the quantity of network search times, and the network search period increases in ascending order as the quantity of network search times increases. For example, when the terminal fails to find a network this time, a network search period between a current network search and a next network search performed by the terminal is set to be greater than a previous network search period. If the terminal fails to find the network again, the network search period may be increased again. In this way, the terminal can rapidly find a network, and network search frequency may be further reduced.

Step 402: Search for a network based on the network search period.

In this embodiment, after determining the network search period based on the quantity of network search times, the terminal searches for the network based on the network search period.

It should be noted that if the network search period unlimitedly increases as the quantity of network search times increases, it is difficult for the terminal to find the network in a proper time. Therefore, when the network search period reaches a third preset threshold, if the network is still not found, the network search period no longer increases as the quantity of search times increases. In this case, a search is performed by using the third preset threshold as the network search period until the search is successful.

In the cell access method provided in this embodiment of this application, if the signal strength of the serving cell does not meet the camping condition and/or the paging condition, the network search period is determined based on the quantity of network search times, and the network is searched for based on the network search period. The network search period increases in ascending order as the quantity of network search times increases. The network search period gradually increases as the quantity of network search times of the terminal increases, so that the terminal can rapidly find the network, network search frequency can be reduced, and power consumption of the terminal may be reduced.

In the foregoing embodiment, when a network disconnection time of the terminal exceeds the third preset threshold, and the terminal is in the still state and/or the screen-off state, it indicates that the terminal does not find an appropriate network in an excessively long time, and the user does not use the terminal at a current moment. In this case, the terminal stops searching for the network.

Figure 5:
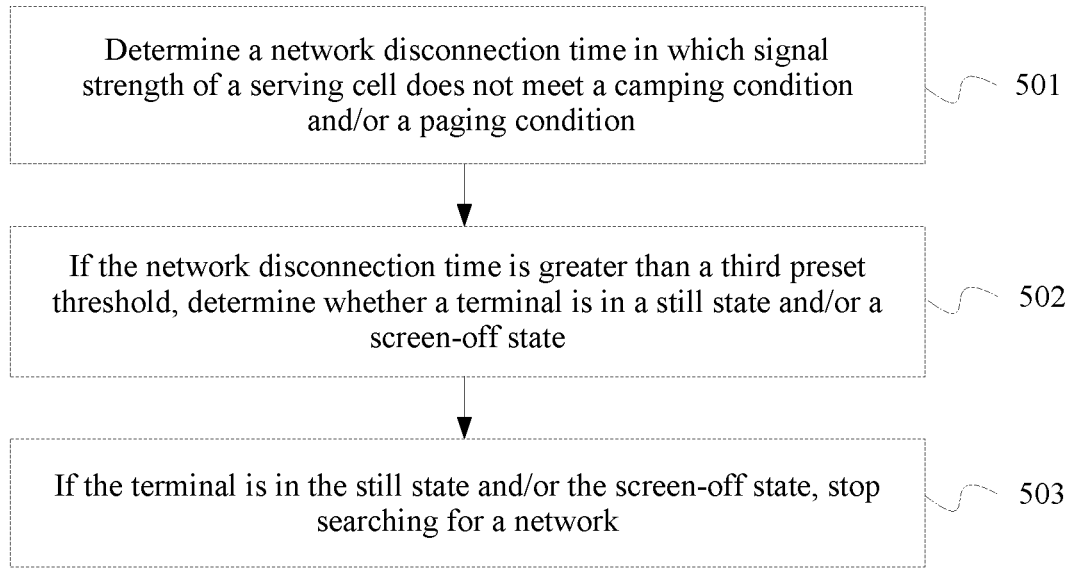
FIG. 5 is a schematic flowchart of Embodiment 5 of a cell access method according to an embodiment of this application.

FIG. 5 is a schematic flowchart of Embodiment 5 of a cell access method according to an embodiment of this application. As shown in FIG. 5, the method in this embodiment may include the following steps.

Step 501: Determine a network disconnection time in which signal strength of a serving cell does not meet a camping condition and/or a paging condition.

In this embodiment, if the signal strength of the serving cell does not meet the camping condition and/or the paging condition, in other words, when a terminal is in a network disconnection state, the terminal determines the network disconnection time in which the terminal is in the network disconnection state. In a specific implementation process, the network disconnection time may be obtained by using a timer. Specifically, when starting searching for a network, the terminal may trigger the timer to perform timing for the network disconnection time, so as to obtain the network disconnection time.

Step 502: If the network disconnection time is greater than a third preset threshold, determine whether a terminal is in a still state and/or a screen-off state.

In this embodiment, if the terminal determines that the network disconnection time is greater than the third preset threshold, it indicates that the terminal does not find an appropriate network in an excessively long time. In this case, whether the terminal is in the still state and/or the screen-off state may be determined, in other words, whether the terminal is in an in-use state is determined.

Step 503: If the terminal is in the still state and/or the screen-off state, stop searching for a network.

In this embodiment, if the terminal is in the still state and/or the screen-off state, it indicates that a user is not using the terminal. In this case, searching for the network may be stopped, to reduce a quantity of network search times of the terminal, so that power consumption of the terminal is reduced, and a standby time of the terminal is prolonged.

It may be understood that the terminal may stop searching for the network in the following three manners:

In a first manner, when the terminal is in the still state, the terminal stops searching for the network.

In a second manner, when the terminal is in the screen-off state, the terminal stops searching for the network.

In a third manner, when the terminal is in the still state and the screen-off state, the terminal stops searching for the network.

In a specific implementation process, an appropriate manner may be selected from the three manners based on an actual application requirement. This is not limited herein.

In the cell access method provided in this embodiment of this application, the network disconnection time in which the signal strength of the serving cell does not meet the camping condition and/or the paging condition is determined; when the network disconnection time is greater than the third preset threshold, whether the terminal is in the still state and/or the screen-off state is determined; and if the terminal is in the still state and/or the screen-off state, searching for the network is stopped. When the network disconnection time is greater than the third preset threshold, and the terminal is in the still state and/or the screen-off state, searching for the network is stopped, to reduce the quantity of network search times of the terminal, so that power consumption of the terminal is reduced.

Optionally, if the terminal is in a screen-on state and/or a moving state, searching for the network is started.

Specifically, after searching for the network is stopped, if it is detected that the terminal is in the screen-on state and/or the moving state, it indicates that the user may use the terminal. In this case, searching for the network is restarted, so that the terminal rapidly finds an appropriate network. It may be understood that the terminal may start searching for the network in the following three manners:

In a first manner, when the terminal is in the screen-on state, the terminal starts searching for the network.

In a second manner, when the terminal is in the moving state, the terminal starts searching for the network.

In a third manner, when the terminal is in the screen-on state and the moving state, the terminal starts searching for the network.

In a specific implementation process, an appropriate manner may be selected from the three manners based on an actual application requirement. This is not limited herein.

Figure 6:
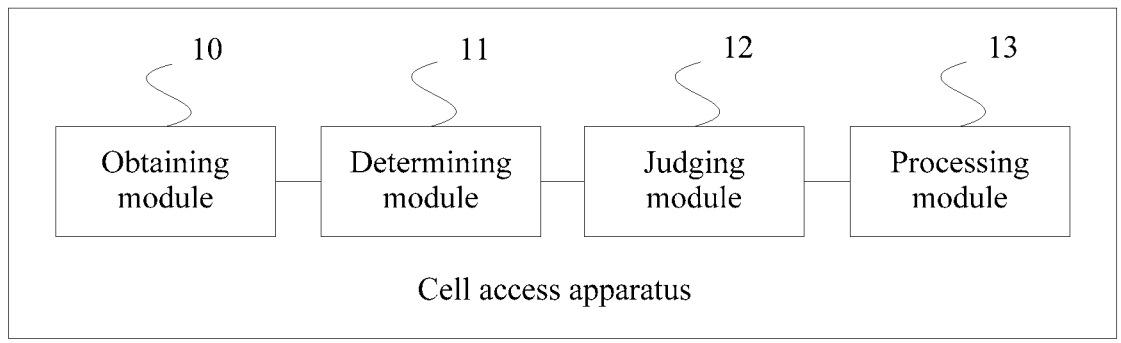
FIG. 6 is a schematic structural diagram of Embodiment 1 of a cell access apparatus according to an embodiment of this application.

FIG. 6 is a schematic structural diagram of Embodiment 1 of a cell access apparatus according to an embodiment of this application. The access apparatus may be an independent terminal, or may be an apparatus integrated into a terminal. The apparatus may be implemented by using software, hardware, or a combination of software and hardware. As shown in FIG. 6, the access apparatus includes:

an obtaining module 10, configured to obtain a movement speed of the terminal;

a determining module 11, configured to determine a signal strength offset value based on the movement speed, where the obtaining module 10 is further configured to obtain signal strength of a serving cell and signal strength of at least one neighboring cell, where the serving cell is a cell on which the terminal currently camps, and the neighboring cell is a cell in which the terminal can receive a signal;

a judging module 12, configured to determine whether a sum of signal strength of a first neighboring cell in the at least one neighboring cell and the offset value is greater than or equal to a preset threshold; and a processing module 13, configured to: if the judging module determines that the sum of the signal strength of the first neighboring cell and the offset value is greater than or equal to the preset threshold, access, by the terminal, the first neighboring cell.

Optionally, the obtaining module 10, the determining module 11, the judging module 12, and the processing module 13 may correspondingly be a processor in the terminal.

The cell access apparatus provided in this embodiment of this application may perform the foregoing method embodiment. An implementation principle and a technical effect of the cell access apparatus are similar to those of the method embodiment. Details are not described herein.

Figure 7:
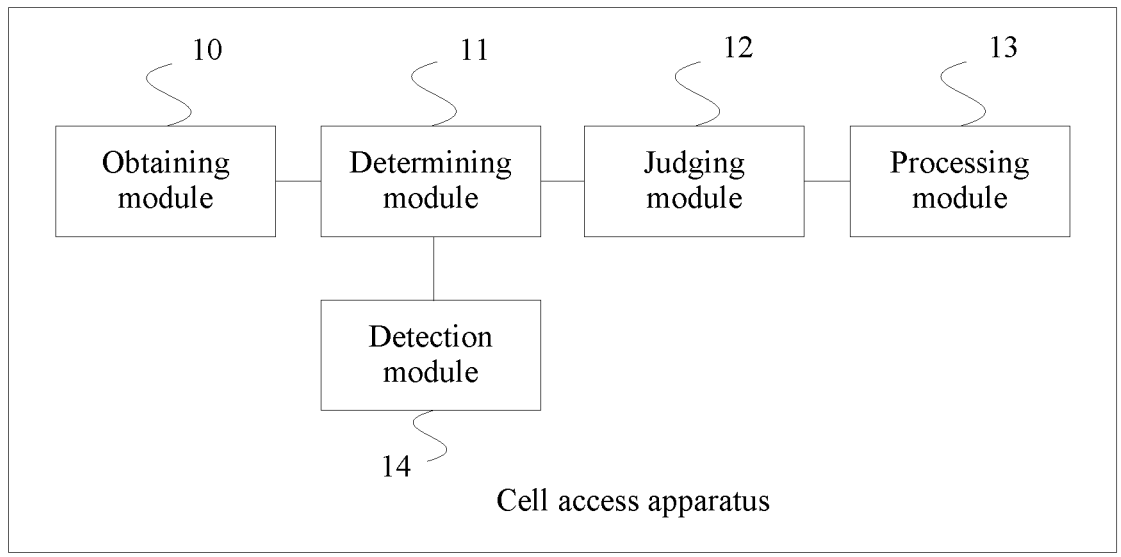
FIG. 7 is a schematic structural diagram of Embodiment 2 of a cell access apparatus according to an embodiment of this application.

Optionally, FIG. 7 is a schematic structural diagram of Embodiment 2 of a cell access apparatus according to an embodiment of this application. Based on the foregoing embodiment, the apparatus further includes a detection module 14.

The determining module 11 is further configured to determine a set of to-be-selected neighboring cells. The set of to-be-selected neighboring cells includes a second neighboring cell whose first strength parameter is greater than that of the serving cell at a preset moment, the preset moment is a moment at which the signal strength of the serving cell and signal strength of the second neighboring cell are most recently obtained, and the first strength parameter is signal strength or a strength parameter obtained by performing calculation on signal strength.

The detection module 14 is further configured to detect a signal change trend of the second neighboring cell in preset duration previous to the preset moment.

The determining module 11 is further configured to determine, as the first neighboring cell, the second neighboring cell whose signal change trend meets a first status. The first status is a steady trend and/or an upward trend.

Optionally, the detection module 14 is further configured to detect a signal change trend of the serving cell in the preset duration.

The determining module 11 is further configured to: when it is determined that the signal change trend of the serving cell in the preset duration meets a second status, determine, as the first neighboring cell, the second neighboring cell whose signal change trend meets the first status. The second status is a steady trend and/or a downward trend.

Optionally, the determining module 11 is further configured to determine the offset value based on a formula $$n = \left(\frac{a}{p}\right) * V,$$

where n is the offset value, V is the movement speed, p is a preset value, and a is a constant.

Optionally, the obtaining module 10 is specifically configured to:

obtain the movement speed of the terminal by using a Global Positioning System GPS; or obtain the movement speed of the terminal by using a sensor.

Optionally, if the terminal is in a connected state, the processing module 13 is specifically configured to:

report, by the terminal, a measurement event to a network side device; and receive a response message returned by the network side device, and access, by the terminal, the first neighboring cell based on the response message.

Optionally, if the terminal is in an idle state, the processing module 13 is specifically configured to:

reselect the first neighboring cell as the serving cell.

The cell access apparatus provided in this embodiment of this application may perform the foregoing method embodiment. An implementation principle and a technical effect of the cell access apparatus are similar to those of the method embodiment. Details are not described herein.

Figure 8:
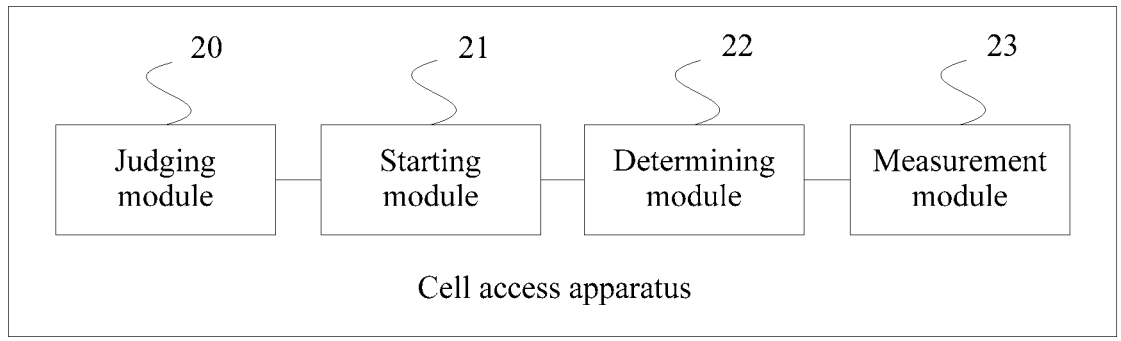
FIG. 8 is a schematic structural diagram of Embodiment 3 of a cell access apparatus according to an embodiment of this application.

FIG. 8 is a schematic structural diagram of Embodiment 3 of a cell access apparatus according to an embodiment of this application. The access apparatus may be an independent terminal, or may be an apparatus integrated into a terminal. The apparatus may be implemented by using software, hardware, or a combination of software and hardware. As shown in FIG. 8, the access apparatus includes:

a judging module 20, configured to determine whether signal strength of a serving cell meets a camping condition and/or a paging condition, where the serving cell is a cell on which the terminal currently camps;

a starting module 21, configured to: when the judging module determines that the signal strength of the serving cell meets the camping condition and/or the paging condition, start measurement of signal strength of at least one neighboring cell, where the neighboring cell is a cell in which the terminal can receive a signal;

a determining module 22, configured to: when the signal strength of the at least one neighboring cell is less than a first preset threshold, determine a measurement period based on a quantity of measurement times, where the measurement period increases in ascending order as the quantity of measurement times increases; and a measurement module 23, configured to perform measurement on the at least one neighboring cell based on the measurement period.

Optionally, the judging module 20, the starting module 21, the determining module 22, and the measurement module 23 may correspondingly be a processor in the terminal.

The cell access apparatus provided in this embodiment of this application may perform the foregoing method embodiment. An implementation principle and a technical effect of the cell access apparatus are similar to those of the method embodiment. Details are not described herein.

Figure 9:
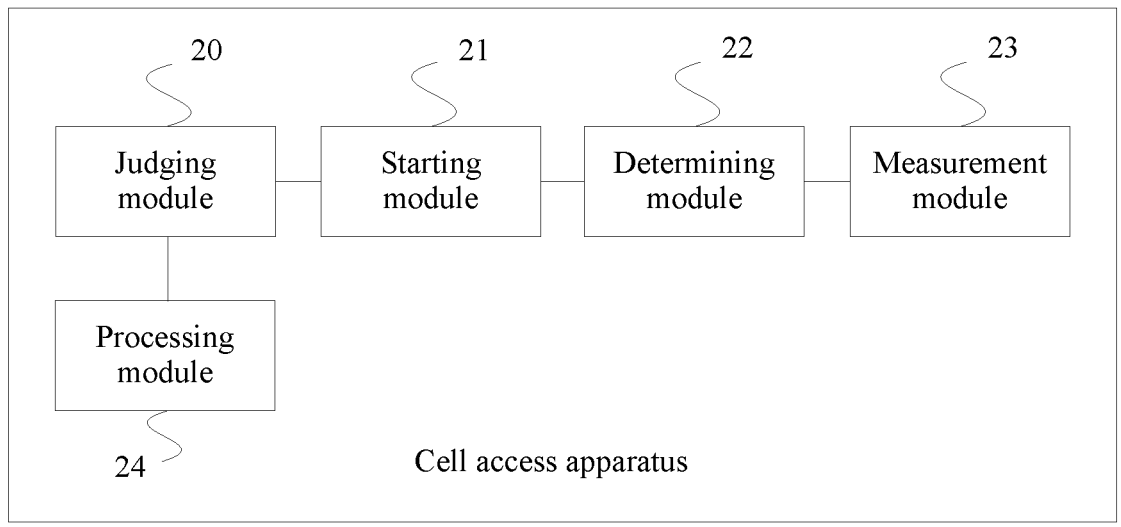
FIG. 9 is a schematic structural diagram of Embodiment 4 of a cell access apparatus according to an embodiment of this application.

Optionally, FIG. 9 is a schematic structural diagram of Embodiment 4 of a cell access apparatus according to an embodiment of this application. Based on the foregoing embodiment, the apparatus further includes a processing module 24.

The judging module 20 is further configured to determine whether the terminal is in a still state and/or a screen-off state.

The judging module 20 is further configured to: when the terminal is in the still state and/or the screen-off state, determine whether the measurement period is greater than a second preset threshold.

The processing module 24 is further configured to: when the measurement period is greater than the second preset threshold, stop measurement of the signal strength of the at least one neighboring cell.

The cell access apparatus provided in this embodiment of this application may perform the foregoing method embodiment. An implementation principle and a technical effect of the cell access apparatus are similar to those of the method embodiment. Details are not described herein.

Figure 10:
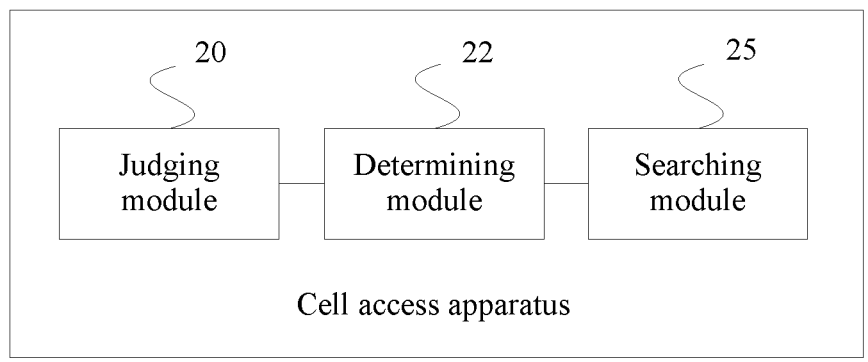
FIG. 10 is a schematic structural diagram of Embodiment 5 of a cell access apparatus according to an embodiment of this application.

Optionally, FIG. 10 is a schematic structural diagram of Embodiment 5 of a cell access apparatus according to an embodiment of this application. Based on the embodiment shown in FIG. 8, the apparatus further includes a searching module 25.

The determining module 22 is further configured to: if the signal strength of the serving cell does not meet the camping condition and/or the paging condition, determine a network search period based on a quantity of network search times. The network search period increases in ascending order as the quantity of network search times increases.

The searching module 25 is configured to search for a network based on the network search period.

The cell access apparatus provided in this embodiment of this application may perform the foregoing method embodiment. An implementation principle and a technical effect of the cell access apparatus are similar to those of the method embodiment. Details are not described herein.

Figure 11:
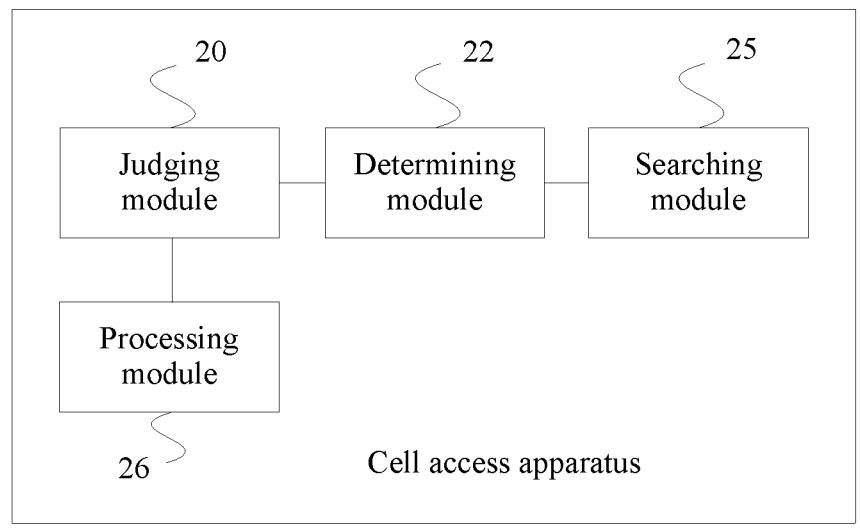
FIG. 11 is a schematic structural diagram of Embodiment 6 of a cell access apparatus according to an embodiment of this application.

Optionally, FIG. 11 is a schematic structural diagram of Embodiment 6 of a cell access apparatus according to an embodiment of this application. Based on the embodiment shown in FIG. 10, the apparatus further includes a processing module 26.

The determining module 22 is further configured to determine a network disconnection time in which the signal strength of the serving cell does not meet the camping condition and/or the paging condition.

The judging module 20 is further configured to: when the network disconnection time is greater than a third preset threshold, determine whether the terminal is in a still state and/or a screen-off state.

The processing module 26 is further configured to: when the terminal is in the still state and/or the screen-off state, stop searching for the network.

Optionally, the processing module 26 is further configured to: when the terminal is in a screen-on state and/or a moving state, start searching for the network.

The cell access apparatus provided in this embodiment of this application may perform the foregoing method embodiment. An implementation principle and a technical effect of the cell access apparatus are similar to those of the method embodiment. Details are not described herein.

Figure 12:
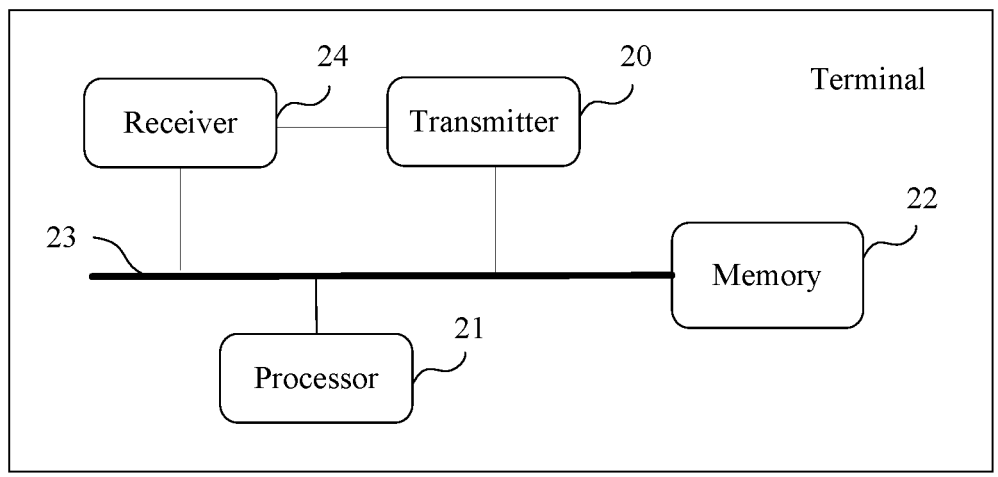
FIG. 12 is a schematic structural diagram of an embodiment of a terminal according to an embodiment of this application.

FIG. 12 is a schematic structural diagram of an embodiment of a terminal according to an embodiment of this application. As shown in FIG. 12, the terminal may include a processor 21, a memory 22, and at least one communications bus 23. The communications bus 23 is configured to implement a communication connection between components. The memory 22 may include a high-speed RAM memory, or may include a non-volatile memory NVM, for example, at least one disk memory. The memory 22 may store various programs, to complete various processing functions and implement method steps in this embodiment. Optionally, the terminal may further include a transmitter 20 and a receiver 24. The receiver 24 in this embodiment may be a corresponding input interface having a communication function and an information receiving function, or may be a radio frequency module or a baseband module on the terminal. The transmitter 20 in this embodiment may be a corresponding output interface having a communication function and an information sending function, or may be a radio frequency module or a baseband module on the terminal. Optionally, the transmitter 20 and the receiver 24 may be integrated into one communications interface, or may be two independent communications interfaces.

In this embodiment, the processor 21 is configured to perform the following steps:

obtaining a movement speed of the terminal;

determining a signal strength offset value based on the movement speed;

obtaining signal strength of a serving cell and signal strength of at least one neighboring cell, where the serving cell is a cell on which the terminal currently camps, and the neighboring cell is a cell in which the terminal can receive a signal;

determining whether a sum of signal strength of a first neighboring cell in the at least one neighboring cell and the offset value is greater than or equal to a preset threshold; and if the sum of the signal strength of the first neighboring cell and the offset value is greater than or equal to the preset threshold, accessing, by the terminal, the first neighboring cell.

Optionally, the processor 21 further performs the following steps:

determining a set of to-be-selected neighboring cells, where the set of to-be-selected neighboring cells includes a second neighboring cell whose first strength parameter is greater than that of the serving cell at a preset moment, the preset moment is a moment at which the signal strength of the serving cell and signal strength of the second neighboring cell are most recently obtained, and the first strength parameter is signal strength or a strength parameter obtained by performing calculation on signal strength;

detecting a signal change trend of the second neighboring cell in preset duration previous to the preset moment; and determining, as the first neighboring cell, the second neighboring cell whose signal change trend meets a first status, where the first status is a steady trend and/or an upward trend.

Optionally, the processor 21 further performs the following step:

detecting a signal change trend of the serving cell in the preset duration.

The processor 21 specifically performs the following step:

when it is determined that the signal change trend of the serving cell in the preset duration meets a second status, determining, as the first neighboring cell, the second neighboring cell whose signal change trend meets the first status, where the second status is a steady trend and/or a downward trend.

Optionally, the processor 21 further performs the following step:

determining the offset value based on a formula $$n = \left(\frac{a}{p}\right) * V,$$

where n is the offset value, V is the movement speed, p is a preset value, and a is a constant.

Optionally, the processor 21 further performs the following step:

obtaining the movement speed of the terminal by using a Global Positioning System GPS; or obtaining the movement speed of the terminal by using a sensor.

Optionally, if the terminal is in a connected state, the transmitter 20 is configured to report a measurement event to a network side device;

the receiver 24 is configured to receive a response message returned by the network side device; and the processor 21 is configured to access, by the terminal, the first neighboring cell based on the response message.

Optionally, if the terminal is in an idle state, the processor 21 is configured to reselect the first neighboring cell as the serving cell.

The terminal provided in this embodiment of this application may perform the foregoing method embodiment. An implementation principle and a technical effect of the terminal are similar to those of the method embodiment. Details are not described herein.

This application further provides an embodiment of another terminal, and a schematic structural diagram of the terminal is shown in FIG. 12. In this embodiment, the processor is configured to perform the following steps:

determining whether signal strength of a serving cell meets a camping condition and/or a paging condition, where the serving cell is a cell on which the terminal currently camps;

if the signal strength of the serving cell meets the camping condition and/or the paging condition, starting measurement of signal strength of at least one neighboring cell, where the neighboring cell is a cell in which the terminal can receive a signal;

if the signal strength of the at least one neighboring cell is less than a first preset threshold, determining a measurement period based on a quantity of measurement times, where the measurement period increases in ascending order as the quantity of measurement times increases; and performing measurement on the at least one neighboring cell based on the measurement period.

Optionally, the processor further performs the following steps:

determining whether the terminal is in a still state and/or a screen-off state;

if the terminal is in the still state and/or the screen-off state, determining whether the measurement period is greater than a second preset threshold; and if the measurement period is greater than the second preset threshold, stopping measurement of the signal strength of the at least one neighboring cell.

Optionally, the processor further performs the following steps:

if the signal strength of the serving cell does not meet the camping condition and/or the paging condition, determining a network search period based on a quantity of network search times, where the network search period increases in ascending order as the quantity of network search times increases; and searching for a network based on the network search period.

Optionally, the processor further performs the following steps:

determining a network disconnection time in which the signal strength of the serving cell does not meet the camping condition and/or the paging condition;

if the network disconnection time is greater than a third preset threshold, determining whether the terminal is in a still state and/or a screen-off state; and if the terminal is in the still state and/or the screen-off state, stopping searching for the network.

Optionally, the processor further performs the following step:

if the terminal is in a screen-on state and/or a moving state, starting searching for the network.

The terminal provided in this embodiment of this application may perform the foregoing method embodiment. An implementation principle and a technical effect of the terminal are similar to those of the method embodiment. Details are not described herein.

It may be clearly understood by a person skilled in the art that, for the purpose of convenient and brief description, division of the foregoing function modules is taken as an example for illustration. In actual application, the foregoing functions may be allocated to different function modules and implemented based on a requirement, to be specific, an inner structure of an apparatus is divided into different function modules to implement all or some of the functions described above. For a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) or a processor (processor) to perform all or some of the steps of the methods described in the embodiments of this application. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of this application, but not for limiting this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A cell access method, comprising:
obtaining, by a terminal, a movement speed of the terminal;
determining, by the terminal, a signal strength offset value based on the movement speed;
obtaining, by the terminal, signal strength of a serving cell and signal strength of at least one neighboring cell, wherein the serving cell is a cell on which the terminal currently camps, and each of the at least one neighboring cell is a cell in which the terminal is able to receive a signal;
determining, by the terminal, a set of to-be-selected neighboring cells, wherein the set of to-be-selected neighboring cells comprises a second neighboring cell whose first strength parameter is greater than a first strength parameter of the serving cell at a preset moment, the preset moment is a moment at which the signal strength of the serving cell and signal strength of the second neighboring cell are most recently obtained, and the first strength parameter is signal strength of the second neighboring cell or a strength parameter obtained by performing calculation on the signal strength of the second neighboring cell;
detecting, by the terminal, a signal change trend of the second neighboring cell in a preset duration previous to the preset moment, wherein detecting the signal change trend of the second neighboring cell in the preset duration comprises:
detecting at least three signal strengths of the second neighboring cell at at least three different time instances in the preset duration; and
determining the signal change trend of the second neighboring cell based on the at least three signal strengths of the second neighboring cell at the at least three different time instances in the preset duration;
determining, by the terminal, as a first neighboring cell, the second neighboring cell whose signal change trend meets a first status, wherein the first status is a steady trend or an upward trend;
determining, by the terminal, whether a sum of signal strength of the first neighboring cell in the at least one neighboring cell and the signal strength offset value is greater than or equal to a preset threshold; and
in response to that the sum of the signal strength of the first neighboring cell and the signal strength offset value is greater than or equal to the preset threshold, accessing, by the terminal, the first neighboring cell.

2. The method according to claim 1, wherein before the determining, as the first neighboring cell, the second neighboring cell whose signal change trend meets a first status, the method further comprises:
detecting, by the terminal, a signal change trend of the serving cell in the preset duration; and
the determining by the terminal, as the first neighboring cell, the second neighboring cell whose signal change trend meets a first status comprises:
in response to determining that the signal change trend of the serving cell in the preset duration meets a second status, determining by the terminal, as the first neighboring cell, the second neighboring cell whose signal change trend meets the first status, wherein the second status is at least one of a steady trend or a downward trend.

3. The method according to claim 1, wherein the determining a signal strength offset value based on the movement speed comprises: determining the signal strength offset value based on a formula $$n = \left(\frac{a}{p}\right) * V,$$

wherein n is the signal strength offset value, v is the movement speed, p is a preset value, and a is a constant.

4. The method according to claim 1, wherein the obtaining a movement speed of a terminal comprises:
obtaining the movement speed of the terminal by using a Global Positioning System GPS; or
obtaining the movement speed of the terminal by using a sensor.

5. The method according to claim 1, wherein in response to that the terminal is in a connected state, the accessing, by the terminal, the first neighboring cell comprises:
reporting a measurement event to a network side device;
receiving a response message returned by the network side device; and
accessing, by the terminal, the first neighboring cell based on the response message.

6. The method according to claim 1, wherein in response to that the terminal is in an idle state,
the accessing, by the terminal, the first neighboring cell comprises:
reselecting the first neighboring cell as the serving cell.

7. A terminal, comprising:
at least one processor; and
a non-transitory computer-readable storage medium coupled to the at least one processor and storing programming instructions for execution by the at least one processor, wherein the programming instructions instruct the terminal to perform following operations comprising:
obtaining a movement speed of the terminal;
determining a signal strength offset value based on the movement speed;
obtaining signal strength of a serving cell and signal strength of at least one neighboring cell, wherein the serving cell is a cell on which the terminal currently camps, and each of the at least one neighboring cell is a cell in which the terminal is able to receive a signal;
determining a set of to-be-selected neighboring cells, wherein the set of to-be-selected neighboring cells comprises a second neighboring cell whose first strength parameter is greater than a first strength parameter of the serving cell at a preset moment, the preset moment is a moment at which the signal strength of the serving cell and signal strength of the second neighboring cell are most recently obtained, and the first strength parameter is signal strength of the second neighboring cell or a strength parameter obtained by performing calculation on the signal strength of the second neighboring cell;
detecting a signal change trend of the second neighboring cell in a preset duration previous to the preset moment, wherein detecting the signal change trend of the second neighboring cell in the preset duration comprises:
detecting at least three signal strengths of the second neighboring cell at at least three different time instances in the preset duration; and determining the signal change trend of the second neighboring cell based on the at least three signal strengths of the second neighboring cell at the at least three different time instances in the preset duration;

determining as a first neighboring cell, the second neighboring cell whose signal change trend meets a first status, wherein the first status is a steady trend or an upward trend;

determining whether a sum of signal strength of the first neighboring cell in the at least one neighboring cell and the signal strength offset value is greater than or equal to a preset threshold; and in response to that the sum of the signal strength of the first neighboring cell and the signal strength offset value is greater than or equal to the preset threshold, accessing, by the terminal, the first neighboring cell.

8. The terminal according to claim 7, wherein the operations further comprise:

detecting a signal change trend of the serving cell in the preset duration; and in response to determining that that the signal change trend of the serving cell in the preset duration meets a second status, determining, as the first neighboring cell, the second neighboring cell whose signal change trend meets the first status, wherein the second status is a steady trend or a downward trend.

9. The terminal according to claim 7, wherein the operations further comprise: determining the signal strength offset value based on a formula $$n = \left(\frac{a}{p}\right) * V,$$

wherein n is the signal strength offset value, v is the movement speed, p is a preset value, and a is a constant.

10. The terminal according to claim 7, wherein the operations further comprise:

obtaining the movement speed of the terminal by using a Global Positioning System GPS; or obtaining the movement speed of the terminal by using a sensor.

11. The terminal according to claim 7, wherein in response to that the terminal is in a connected state, the terminal further comprises a transmitter and a receiver;

the transmitter is configured to report a measurement event to a network side device;

the receiver is configured to receive a response message returned by the network side device; and the operations further comprise accessing, by the terminal, the first neighboring cell based on the response message.

12. The terminal according to claim 7, wherein in response to that the terminal is in an idle state, the operations further comprise reselecting the first neighboring cell as the serving cell.

13. A terminal, comprising:

at least one processor; and a non-transitory computer-readable storage medium coupled to the at least one processor and storing programming instructions for execution by the at least one processor, wherein the programming instructions instruct the terminal to perform following operations comprising:

determining whether signal strength of a serving cell meets at least one of a camping condition or a paging condition, wherein the serving cell is a cell on which the terminal currently camps;

in response to that the signal strength of the serving cell meets the camping condition or the paging condition, starting measurement of signal strength of at least one neighboring cell, wherein each of the at least one neighboring cell is a cell in which the terminal is able to receive a signal;

in response to that the signal strength of the at least one neighboring cell is less than a first preset threshold, determining a measurement period based on a quantity of measurement times, wherein the measurement period increases in ascending order as the quantity of measurement times increases;

performing measurement on the at least one neighboring cell based on the measurement period;

determining a second neighboring cell whose first strength parameter is greater than a first strength parameter of the serving cell at a preset moment, the preset moment is a moment at which the signal strength of the serving cell and signal strength of the second neighboring cell are most recently obtained, and the first strength parameter is signal strength of the second neighboring cell or a strength parameter obtained by performing calculation on the signal strength of the second neighboring cell;

detecting a signal change trend of the second neighboring cell in a preset duration previous to the preset moment, wherein detecting the signal change trend of the second neighboring cell in the preset duration comprises:

detecting at least three signal strengths of the second neighboring cell at at least three different time instances in the preset duration; and determining the signal change trend of the second neighboring cell based on the at least three signal strengths of the second neighboring cell at the at least three different time instances in the preset duration.

14. The terminal according to claim 13, wherein the operations further comprise:

determining whether the terminal is in a still state or a screen-off state;

in response to that the terminal is in the still state or the screen-off state, determining whether the measurement period is greater than a second preset threshold; and in response to that the measurement period is greater than the second preset threshold, stopping measurement of the signal strength of the at least one neighboring cell.

15. The terminal according to claim 13, wherein the operations further comprise:

in response to that the signal strength of the serving cell does not meet the camping condition or the paging condition, determining a network search period based on a quantity of network search times, wherein the network search period increases in ascending order as the quantity of network search times increases; and searching for a network based on the network search period.

16. The terminal according to claim 15, wherein the operations further comprise:

determining a network disconnection time in which the signal strength of the serving cell does not meet the camping condition or the paging condition;

in response to that the network disconnection time is greater than a third preset threshold, determining whether the terminal is in a still state or a screen-off state; and in response to that the terminal is in the still state or the screen-off state, stopping searching for the network.

17. The terminal according to claim 16, wherein the operations further comprise:

in response to that the terminal is in a screen-on state or a moving state, starting searching for the network.

* * * * *